(12) United States Patent
Sanders et al.

(10) Patent No.: US 7,751,055 B2
(45) Date of Patent: *Jul. 6, 2010

(54) HOLLOW CORE FIBER OPTICAL GYRO

(75) Inventors: Glen A. Sanders, Scottsdale, AZ (US); Lee K. Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/342,158

(22) Filed: Jan. 27, 2006

(65) Prior Publication Data

US 2008/0137091 A1    Jun. 12, 2008

Related U.S. Application Data

(60) Provisional application No. 60/648,163, filed on Jan. 28, 2005.

(51) Int. Cl.
   *G01C 19/72* (2006.01)
(52) U.S. Cl. .................................................... 356/461
(58) Field of Classification Search ................ 356/461, 356/470
   See application file for complete search history.

(56) References Cited

U.S. PATENT DOCUMENTS

| 4,274,742 | A | * | 6/1981 | Lustig | 356/470 |
| 4,323,310 | A | * | 4/1982 | Shaw et al. | 356/461 |
| 4,352,562 | A | * | 10/1982 | Minden | 356/470 |
| 4,673,293 | A | * | 6/1987 | Sanders | 356/470 |
| 5,018,857 | A | * | 5/1991 | Sanders et al. | 356/461 |
| 5,229,831 | A | * | 7/1993 | Carroll et al. | 356/461 |
| 5,237,387 | A |   | 8/1993 | Sanders |   |
| 5,296,912 | A |   | 3/1994 | Strandjord et al. |   |
| 5,349,441 | A |   | 9/1994 | Sanders |   |
| 5,384,637 | A |   | 1/1995 | Sanders et al. |   |
| 5,465,149 | A |   | 11/1995 | Strandjord et al. |   |
| 6,539,155 | B1 |   | 3/2003 | Broeng et al. |   |
| 7,245,381 | B2 | * | 7/2007 | Marino et al. | 356/461 |
| 2004/0061863 | A1 | * | 4/2004 | Digonnet | 356/460 |
| 2004/0263856 | A1 |   | 12/2004 | Willig et al. |   |

FOREIGN PATENT DOCUMENTS

| EP | 0 240 949 A2 | 10/1987 |
| EP | 1 391 693 A1 | 2/2004 |

OTHER PUBLICATIONS

PCT International Search Report PCT/US2006/002839, Jun. 6, 2006.
Carroll, R. et al., International Society for Optical Engineering: "The Passive Resonator Fiber Optic Gyro and Comparison to the Interferometer Fiber Gyro," Selected Papers on Fiber Optic Gyroscopes, SPIE Milestone Series, Bellingham, SPIE, US, vol. MS 8, 1989, pp. 486-494.

(Continued)

*Primary Examiner*—Michael A Lyons
(74) *Attorney, Agent, or Firm*—Fogg & Powers LLC

(57) ABSTRACT

Apparatus is provided for a fiber optic gyro. The fiber optic gyro includes a ring resonator having first and second counter-propagating directions. The ring resonator includes a coil having an axis and an optical fiber having a hollow core. The ring resonator is configured to produce a first resonance frequency when a first light beam circulates through the hollow core in the first counter-propagating direction and produce a second resonance frequency when a second light beam circulates through the hollow core in the second counter-propagating direction. A difference between the resonance frequencies indicates a rotation rate of the fiber optic gyro about the axis.

22 Claims, 1 Drawing Sheet

OTHER PUBLICATIONS

Broeng et al., "Photonic Crystal Fibers: A New Class of Optical Waveguides", "Optical Fiber Technology", 1999, pp. 305-330, vol. 5, Publisher: Academic Press.

Chen et al., "Highly birefringent hollow-core photonic bandgap fiber", "Optics Express 3888", Aug. 9, 2004, vol. 12, No. 16, Publisher: Optical Society of America.

Cregan et al., "Single-Mode Photonic Band Gap Guidance of Light in Air", Sep. 3, 1999, pp. 1537-1539, vol. 285, Published in: US.

Hansen et al., "Air-Guiding Photoni Bandgap Fibers: Spectral Properties, Macrobending Loss, and Practical Handling", "Journal of Lightwave Technology", Jan. 2004, p. 11, vol. 22, No. 1, Publisher: IEEE.

Hotate et al., "Resonator Fiber Optic Gyro Using Digital Serrodyne Modulation-Method to Reduce the Noise Induced by the Backscattering and Closed Loop Operation Using Digital Signal Processing", "13th International Conference on Optical Fiber Sensors", Apr. 12-16, 1999, pp. 104-107, vol. 3746, Publisher: SPIEE.

Mangan et al., "Low Loss (1.7dB/km) Hollow Core Photonic Bandgap Fiber", 2004, Publisher: Optical Society of America.

Sanders, Glen, "Critical Review of Resonator Fiber Optic Gyroscope Technology", "Proc. SPIE Fiber Optic and Laser Sensors X", Sep. 1992, pp. 133-159, vol. CF44, Publisher: SPIEE, Published in: Boston, MA.

Sanders et al., "Passive Ring Resonator Method for Sensitive Inertial Rotation Measurements in Geophysics and Relativity", "Optics Letter", Nov. 1981, pp. 569-571, vol. 6, No. 11, Publisher: Optical Society of America.

Sanders et al., "Novel Polarization-rotating Fiber Resonator for Rotation Sensing Applications", "Fiber Optic and Laser Sensors VII", , pp. 373-381, vol. 1169, Publisher: Proc. SPIE.

Sanders et el., "Fiber Optic Gyro Technology Trends—A Honeywell Perspective", "Optical Fiber Sensors Conference Technical Digest", 2002, pp. 5-8, vol. 1, Publisher: IEEE.

Smith et al., "Recent Developments in Fiberoptic Ring Laser Gyros", "Fiber Optic and Laser Sensors VIII", 1990, pp. 103-106, vol. 1367, Publisher: SPIE.

Strandjord et al., "Performance Improvements of a Polarization-Rotating Resonator Fiber Optic Gyroscope", "Fiber Optic and Laser Sensors X", 1992, pp. 94-104, vol. 1795, Publisher: SPIE.

Suzuki et al., "Reduction of Backscattering Induced Noise by Ternary Phase Shift Keying in Monolithically Integrated Micro Optic Gyro on Silica Planar Lightwave Circuit", "13th International Conference on Optical Fiber Sensors", Apr. 12-16, 1999, pp. 78-81, vol. 3746, Publisher: SPIE.

* cited by examiner

HOLLOW CORE FIBER OPTICAL GYRO

CROSS REFERENCE TO RELATED APPLICATION

This application claims the benefit of U.S. Provisional Application 60/648,163, filed Jan. 28, 2005.

FIELD OF THE INVENTION

The present invention generally relates to gyro systems, and more particularly relates to rotational sensors for use in a fiber optic gyro.

BACKGROUND OF THE INVENTION

Gyros have been used to measure rotation rates or changes in angular velocity about an axis. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid core of the fiber. The two counter-propagating (CW and CCW) beams experience different pathlengths while propagating around a rotating path, and the difference in the two pathlengths is proportional to the rotational rate.

In general, the size of the FOG affects the accuracy or sensitivity of a FOG. For example, smaller FOGs typically have less accuracy than larger FOGs. FOGs have accuracies that generally increase with the area encircled by the optical path of the light beams. Thus, the larger the area enclosed by the optical path, the greater the signal-to-noise ratio of the FOG. Also, to improve the signal-to-noise ratio of the FOG, the optical path may be increased by increasing the number of turns of the coil.

In a resonator fiber optic gyro (RFOG), the counter-propagating light beams are monochromatic and recirculate through multiple turns of the coil and for multiple passes through the coil using a recirculator such as a fiber coupler. The beam generating device typically modulates and/or shifts the frequencies of each of the counter-propagating light beams so that the resonance frequencies of the resonant coil may be observed. The resonance frequencies for each of the CW and CCW paths through the coil are based on a constructive interference of successively recirculated beams in each optical path. A rotation of the coil produces a shift in the respective resonance frequencies of the resonant coil and the frequency difference associated with tuning the CW beam and CCW beam frequencies to match the coil's resonance frequency shift due to rotation indicates the rotation rate. In the RFOG, effects stemming from the presence of glass material of the optical fiber may shift the resonance frequencies of the CW and CCW paths and thus produce a false indication of rotation or inaccurate measurement of rotation rate. A reflective mirror may be used to recirculate the counter-propagating light beams in the coil but this typically reduces the signal-to-noise ratio from losses generated at the transition from the mirror to the coil. Anomalies that decrease the accuracy of the measurement of the rotational rate may be generated from a non-linear Kerr effect, stimulated Brillioun scattering, polarization errors, bend losses. These error mechanisms are also sensitive to the environment which, for example, gives rise to unwanted temperature sensitivity.

The non-linear Kerr effect occurs when high monochromatic light power inside the RFOG alters the index of refraction of the glass in the optical fiber. A mismatch of intensities of the CW and CCW beams may induce a bias on the observed frequency shifts on the order of several degrees/hour. Stimulated Brillioun scattering (SBS) occurs when a high intensity associated with a high finesse in the fiber resonator causes lasing in the glass fiber, and this lasing generally promotes large instabilities in the measurement of the resonance frequencies. Polarization-induced errors may result from fiber couplers that incidentally couples light into a second polarization mode, either from one optical fiber to an adjacent optical fiber or within the same fiber. Light may also be cross-coupled between polarization states in the fiber coil itself. The second polarization mode may resonate to produce an asymmetry in the resonance lineshape of the polarization mode used to measure a rotation. Even though the resonance frequency of the second polarization mode is the same for the CW and CCW beams, the amplitude may be different, thus causing different observations, beyond the affect of rotation, of the resonance frequencies of the CW and CCW beams. Polarization-induced error may severely limit the accuracy of the RFOG because determination of the resonance centers for each of the resonance frequencies of the CW and CCW beams directly affects the rotational rate measurement.

Accordingly, it is desirable to provide a fiber optic gyro capable of measuring rotational rates with an accuracy sufficient for navigation systems. In addition, it is desirable to provide a high accuracy fiber optic gyro for integration with relatively small platforms. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for sensing a rotational rate about an axis. In one exemplary embodiment, a fiber optic gyro for measuring a rotation rate of the fiber optic gyro about an axis is provided comprising a ring resonator having first and second counter-propagating directions. The ring resonator comprises a coil having the axis and comprising an optical fiber having a hollow core. The ring resonator is configured to produce a first resonance frequency for a first light beam circulating through the hollow core in the first counter-propagating direction and produce a second resonance frequency for a second light beam circulating through the hollow core in the second counter-propagating direction. A difference between the first resonance frequency and the second resonance frequency indicates the rotation rate.

In another exemplary embodiment, a sensor for measuring a rotation rate of the sensor about an axis is provided comprising an optical ring resonator and a light source coupled to the optical ring resonator and configured to produce an input light beam. The optical ring resonator has first and second counter-propagating directions, a first resonance frequency based on the first counter-propagating direction, and a second resonance frequency based on the second counter-propagating direction. The ring resonator comprises a coil having the axis and comprising an optical fiber having a hollow core. The optical ring resonator is configured to circulate a first circulating light beam through the hollow core in the first counter-propagating direction and circulate a second circulating light beam through the hollow core in the second counter-propagating direction. The first and second circulating light beams are based on the input light beam. The first circulating light beam has a frequency based on the first resonance frequency, and the second circulating light beam has a frequency based on the second resonance frequency. A difference between the frequency of the first circulating light beam and the frequency of the second circulating light beam is proportional to the rotation rate of the sensor about the axis.

In another exemplary embodiment, a resonator fiber optic gyro (RFOG) is provided comprising a beam generator configured to transmit first and second input light beams, a ring resonator coupled to the beam generator and having first and second counter-propagating directions, a photodetector, and a frequency shifter. Each of the input light beams has a frequency. The ring resonator comprises an optical fiber coil having a hollow core and a recirculator. The optical fiber coil is configured to circulate first and second counter-propagating light beams through the hollow core. The first counter-propagating light beam is based on the first input light beam, and the second counter-propagating light beam is based on the second input light beam. The recirculator is configured to direct the first and second input light beams into the hollow core. The photodetector is configured to detect a first resonance center based on the frequency of the first input light beam and further configured to detect a second resonance center based on the frequency of the second input light beam. The frequency shifter is configured to shift the frequency of the second input light beam by a frequency $\Delta f$ to tune the second input light beam to the second resonance center. The frequency $\Delta f$ indicates a rotational rate of the RFOG.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
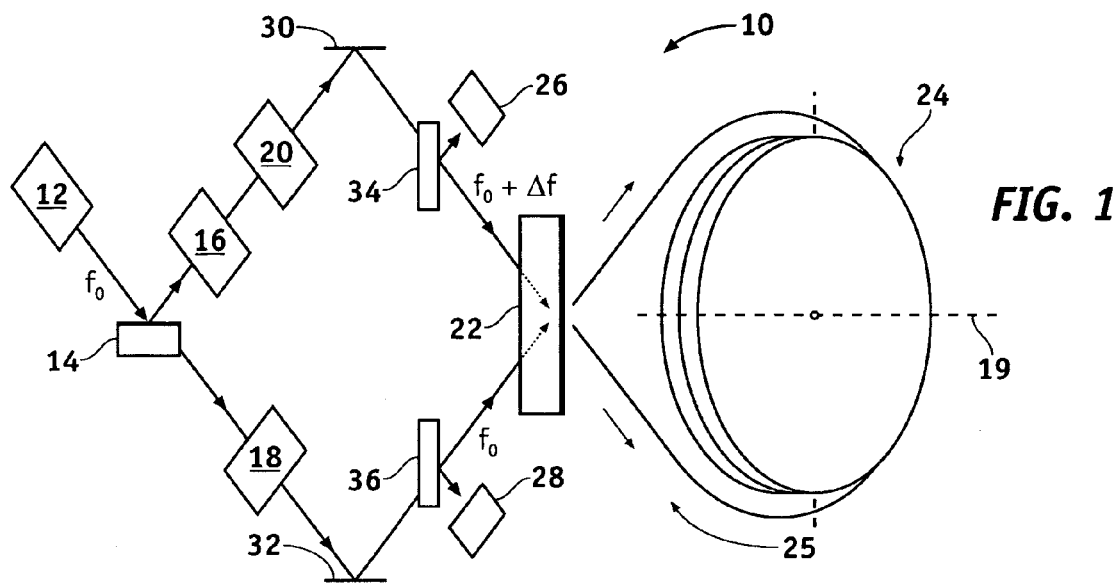
FIG. 1 is a schematic diagram of a resonator fiber optic gyro in accordance with an exemplary embodiment of the present invention.

Referring now to the drawings, FIG. 1 is a schematic diagram of a resonator fiber optic gyro (RFOG) 10 in accordance with an exemplary embodiment of the present invention. The RFOG 10 includes a tunable light source 12 (e.g., a laser) configured to generate a light beam having a frequency $f_o$, a beam splitter 14 configured to receive the light beam from the light source 12 and further configured divide the light beam from the light source 12 into first and second light beams, a first wave modulator 16 configured to receive the first light beam from the beam splitter 14 and further configured to modulate the first modulated light beam, a second wave modulator 18 configured to receive the second light beam from the beam splitter 14 and further configured to modulate the second light beam, a frequency shifter 20 configured to receive the first modulated light beam from the first wave modulator 16 and further configured to shift the frequency of the first modulated light beam, a recirculator 22 (e.g., a highly reflective mirror with low, but non-zero transmittance) configured to receive the first modulated light beam from the frequency shifter 20 and the second modulated light beam from the second wave modulator 18, a hollow core optical fiber coil 24 having an axis 19 and having first and second ends coupled to the high reflectivity mirror of the recirculator 22, a first photodetector 26 configured to receive a first return beam from the recirculator, and a second photodetector 28 configured to receive a second return beam from the recirculator 22. The combination of the recirculator 22 and the fiber coil 24 is referred to a resonator 25. The recirculator 22 is further configured to introduce the first and second modulated light beams to the optical fiber coil 24 and recirculate the first and second modulate light beams through the optical fiber coil 24.

The RFOG 10 may include additional mirrors 30, 32 and beam splitters 34, 36 for directing the propagation of light beams from the light source 12 to the optical fiber coil 24 and for directing light from the recirculator 22 to the photodetectors 26, 28. The recirculator 22 is preferably a mirror with high reflectivity and non-zero transmittance. In general, the recirculator 22 may be any optical element that reintroduces light emerging from one end of the optical fiber coil 24 into the other end of the fiber coil 24, thus causing light to propagate through the fiber coil 24 many times. The use of a mirror instead of a fiber optic coupler is one advantage of the RFOG 10 since the mirror may be used to attenuate polarization errors and other error mechanisms, and may introduce fewer imperfections.

In an exemplary embodiment, the light source 12 is a tunable laser having frequency stability, substantially narrow line width, and relatively high power capability. The wave modulators 16, 18 frequency-modulate the first and second light beams such as by introducing a sinusoidal waveform into the light beams, and the particular modulation may be selected to improve sensitivity of the RFOG 10 to detect frequency shift ($\Delta f$), described in greater detail herein below. The first modulated light beam and second modulated light beam are introduced into the optical fiber coil 24 in a counterclockwise (CCW) and a clockwise (CW) direction, respectively, such as via opposite ends of the optical fiber coil 24.

The CW beam has an unshifted laser frequency ($f_o$) and is introduced into the resonator 25. For rotation sensing, the frequency $f_o$ of the CW beam is tuned (e.g., by tuning the frequency of the laser 12 to the resonance frequency of the resonator 25 in the CW direction. The frequency shifter 20 is configured to tune the frequency $\Delta f$ to align the CCW beam frequency with a resonance center relative to the resonance frequency of the resonator in CCW direction. During rotation sensing, the frequency shifter 20 frequency shifts the light from the laser 12 by an amount $\Delta f$ and injects the frequency shifted light into the optical fiber coil 24 in the CCW direction. To apply a relatively pure frequency shift, an acousto-optic frequency shifter may be used or a phase shifter may be used, with the phase shift being a sawtooth waveform, described in greater detail hereinafter. When using the phase shifter, the phase shift amplitude is an integer multiple of $2\pi$ and the sawtooth has a substantially fast flyback time when compared to the waveform period.

To measure the resonance center-frequencies of the optical fiber coil 24, in either the CW direction or CCW direction, a standard synchronous detection technique is used. Each input light beam (e.g., CW beam and CCW beam) is sinusoidally phase-modulated, and therefore frequency modulated at a frequency ($f_m$) to dither an input beam frequency across a resonance lineshape as measured by the photodetectors 26, 28. For example, additional circuitry coupled to the photodetectors 26, 28 may demodulate the outputs of the photodetectors 26, 28 at $f_m$ to measure resonance centers indicated by the light outputs of the CW and CCW beams. At a line center of the resonance lineshape, or the resonance center, the photodetectors 26, 28 detect a minimum output at the fundamental detection frequency fm. When the input beam frequency (e.g., $f_0$ or $f_0+\Delta f$) is off-resonance, an error signal at $f_m$ is sensed by the photodetectors 26, 28 and used to tune the respective beam frequency to the respective resonance frequency of the optical ring resonator 25. The frequency of the CW beam is tuned by changing the frequency of the laser, $f_0$, and the frequency of the CCW beam is adjusted via a feedback loop that changes the sawtooth frequency of the frequency shifter, $\Delta f$, so that $f_0+\Delta f$ matches the CCW resonance frequency of the optical ring resonator 25.

When $f_0$ is tuned away from the resonance frequency of the resonator 25 in the CW direction, the energy from the CW beam does not enter the optical fiber and the light is reflected off the highly reflective mirror of the recirculator 22 to produce a maximum intensity at the CW photodetector 26. When $f_0$ is tuned at the resonance frequency of the resonator 25 in the CW direction, the CW beam enters the optical fiber coil 24, and the light striking the CW photodetector 26 has a minimum output thereby indicating the resonance center. Similarly, the CCW beam enters the optical fiber coil 24 when the CCW beam is tuned to the resonance frequency of the resonator 25 in the CCW direction.

In the absence of rotation, the round-trip path-lengths of the CW and CCW beams inside the resonator 25 in the CW and CCW direction, respectively, are substantially equal. Thus, $\Delta f$ is tuned to zero by the frequency shifter 20. In the presence of rotation of the optical fiber coil about the axis 19 of the optical fiber coil 24, the round-trip path-lengths differ between the CW and the CCW directions producing a resonance frequency difference between the two directions that is proportional to the rotation rate. By tuning the frequency $\Delta f$ to track the CCW resonance center, the rotation rate is determined.

Frequency shifting is obtained using a serrodyne method whereby a phase ramp is applied to an input light beam (e.g., CW and CCW beams). By driving a phase modulator, such as the wave modulators 16, 18, with a continuous and linear phase ramp, a frequency shift may be obtained, that is proportional to the slope of the phase ramp. A sawtooth waveform of having a $2\pi$ phase height and a frequency $\Delta f$ produces substantially equivalent results as the continuous ramp, and the sawtooth frequency ($\Delta f$) is adjusted to track the CCW resonance in the presence of rotation. As previously mentioned, the frequency shifter 20 may apply a relatively pure frequency shift when the sawtooth waveform flyback time is substantially fast compared to the waveform period.

A hollow core, band-gap, optical fiber having an extremely low bend loss is preferably used with the resonator 25, and the coil 24 preferably has a relatively large number of turns about a substantially small area. For example, the coil 24 may have from about 20-40 turns of the optical fiber about a one centimeter diameter. The hollow core optical fiber is typically glass-based. In the hollow core optical fiber, light injected from the recirculator 22 traverses mostly through free space (e.g., air or a vacuum) along the core, and only about a few percent of the optical energy of light is contained in the glass within the walls of the fiber. Because a significant amount of the light energy mostly traverses through free space along the hollow core of optical fiber, the transition between the mirrored version of the recirculator 22 and the hollow core optical fiber has a near-perfect index matching, and a high reflectivity laser mirror with low loss and good polarization properties may be used for the recirculator 22. The hollow core fiber is suited to significantly attenuate, or eliminate altogether, the rotation measurement errors commonly associated with the properties of the glass medium in the core of conventional fibers.

In one exemplary embodiment, the RFOG 10 is constructed on a silicon-based micro-optical bench that integrates electronics and optics and provides an efficient and expedient interface between the two. Optical functions, such as associated with the wave modulators 16, 18, may be embedded on the surface of the optical bench, and miniature optical components having a feature size of as little as 10 microns may be mounted on silicon surfaces to eliminate large bulk optics, even though the light wave may be traveling in free space. Some of these optical functions may also be embedded in waveguides residing in the silicon material. In this exemplary embodiment, the laser and related frequency tuning components may also be mounted on the optical bench, and using the serrodyne method for frequency shifting enables the use of an integrated optical phase modulator in a silicon waveguide for the frequency shifter. A micro-electro-mechanical system (MEMS) optical prism may be used as a refractive laser prism capable of directing light into and out of the silicon waveguide. The use of these techniques allows the fabrication of optics in or on a silicon platform and thus integrated with the electronics.

Figure 2:
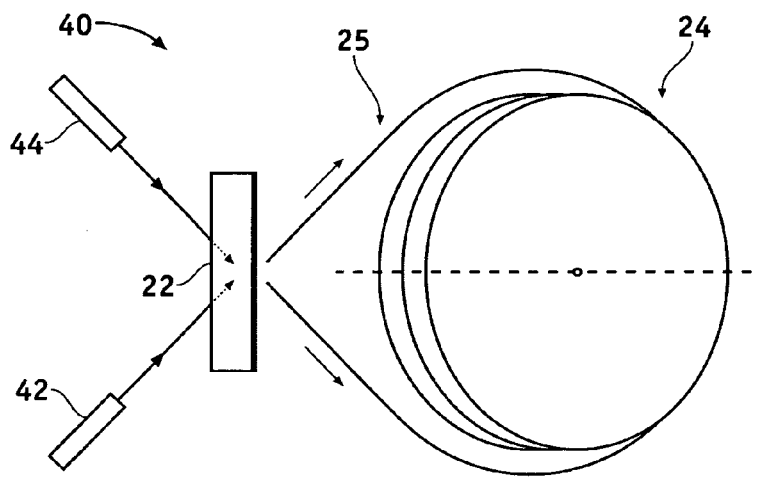
FIG. 2 is a schematic diagram of a resonator fiber optic gyro in accordance with another exemplary embodiment of the present invention.

FIG. 2 is a schematic diagram of a resonant fiber optic gyro 40 in accordance with another exemplary embodiment of the present invention. The RFOG 40 includes first and second tunable lasers 42, 44 that each synthesize the CW and CCW light beams, respectively, and introduce the light beams into the resonator 25 thereby replacing the beam splitter 14 shown in FIG. 1. The resonator 25 includes the highly reflective mirror of the recirculator 22 and the optical fiber coil 24. The light beam produced by the first laser 42 is tuned to a frequency $f_0$, and the light beam produced by the second laser 44 is tuned to a frequency $f_0+\Delta f$ thereby replacing the frequency shifter 20 shown in FIG. 1. In this example, the relative frequency drift and jitter between the two laser frequencies should be substantially minimized to a level that minimizes or does not affect the accuracy of the frequency shift, and thus rotational rate, measurement. This may be accomplished by a very high gain electronic servo that controls the relative phase drift and jitter between the lasers. Each of the lasers 42, 44 sinusoidally modulates the respective frequencies thereby replacing the frequency modulators 16, 18 shown in FIG. 1.

One advantage of using this technique of multiple lasers is that it is straightforward to have the CW beam frequency adjusted to a different resonance of the resonator than the CCW beam frequency is adjusted to. Since the resonance frequencies of the ring resonator appear periodically every time an integer number of wavelengths fits into the optical pathlength (e.g., from the recirculator into one end of the coil and through the coil to the other end of the coil and returning to the recirculator) of the resonator, the CW and CCW beam frequencies can be tuned to, for example, the frequencies where n and (n+1) wavelengths fit into the CW and CCW paths respectively, where n represents the integer number of wavelengths of light traversed in a round trip of the optical pathlength of the resonator. This alleviates rotation rate errors that can arise due to the backscattering of light from one beam into another. However, using a different number of wavelengths form the different beams does introduce the optical pathlength of the ring resonator into the rotation rate measurement. In this case, errors due to this issue may be alleviated by incorporating a third laser beam (e.g., in the CCW direction at a frequency where n−1 wavelengths fit into the CCW optical pathlength of the resonator).

Figure 3:
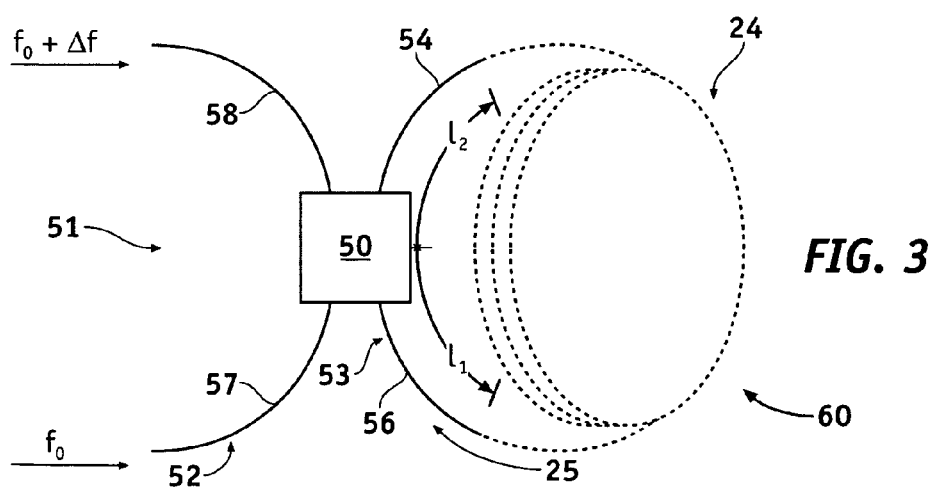
FIG. 3 is a schematic diagram partially illustrating a resonator fiber optic gyro having a fiber coupler in accordance with another exemplary embodiment of the present invention.

FIG. 3 is a schematic diagram partially illustrating a resonator fiber optic gyro 60 having a fiber coupler 51 in accordance with another exemplary embodiment of the present invention. In this exemplary embodiment, the fiber coupler 51 replaces the recirculator 22 shown in FIG. 1 to introduce the input light beams to the optical fiber coil 24 and reintroduce light emerging from one end of the optical fiber coil 24 into the other end of the fiber coil 24, and the optical fiber coil 24 and the fiber coupler 51 together form the resonator 25. The fiber coupler 51 comprises a first solid core optical fiber segment 52 and a second solid core optical fiber segment 53 that is optically coupled to the first fiber segment 52 at a coupling region 50. The first fiber segment 52 receives the input light beams (e.g., CW and CCW input beams) such as from the tunable light source 12. For example, a first end 58 of the first fiber segment 52 receives the CCW input light beam, and a second end 57 of the first fiber segment 52 receives the CW input light beam. The second fiber segment 53 has opposing ends 54, 56 that are each coupled to a corresponding end of the optical fiber coil 24 such as by a fusion splice, a combination of mechanical and adhesive splice (e.g., via a butt-joint), and the like.

In general, the fiber coupler 51 transfers about one-percent (1%) of the intensity of the input light beams in the first fiber segment 52 to the second fiber segment 53. The length of each of the ends 54, 56 of the second fiber segment 53 is selected to minimize the impact of propagating light through the solid core optical fiber of the second fiber segment 53 in the resonator 25. One measure of minimizing this impact is to retain the benefit of removing about ninety-nine percent (99%) of glass from the optical path of the circulating light in the resonator 25. For example, the lengths ($l_1$ and $l_2$) of the ends 56 and 54 are selected such that $$n \times (l_1 + l_2) < L/100,$$

where L is the length of the hollow core optical fiber coil 24 and n is the index of refraction for the solid core optical fiber (e.g., index of refraction for glass) of the second fiber segment 53.

Advantages of the RFOG 10 include, but are not limited to: a capability of providing about a 0.01 deg/hr bias and about a 0.001 deg/root-hr angle random walk (ARW) in a low-cost, small-sized package; a resonator having less than a couple meters of fiber wound into tight turns with low loss; use of a high reflectivity mirror rather than a fiber optic coupler to recirculate light in the ring resonator; a compact, stable laser whose key components can be mounted on a silicon optical bench; a MEMS prism embeddable in silicon that efficiently directs light in and out of silicon; minimized non-linear effects in silica fibers that may promote gyro errors; attenuated thermally-driven polarization errors by minimizing the drift (over temperature) of a potential second resonance peak (or dip) corresponding to a second polarization mode in the optical fiber; substantial reduction of light loss at transition point to optical fiber coil 24; a capability of winding the optical fiber coil into a very tight (e.g., pencil diameter) loops with little to no change in light transmission properties.

The RFOG 10 is suited to a variety of applications including, by way of example and not of limitation, applications requiring inertial guidance such as aircraft, land vehicle, submarine, satellite, surface ship navigation, and the like. In addition, the relatively small size envisioned for the RFOG 10 would enable a practical usage on very small platforms including, by way of example and not of limitation, small robots, individual soldier footwear, and small-scale satellites.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A fiber optic gyro for measuring a rotation rate of the fiber optic gyro about an axis, the fiber optic gyro comprising:
    a ring resonator having first and second counter-propagating directions, said ring resonator comprising:
        a coil having the axis and comprising an optical fiber having a hollow core, said ring resonator configured to:
            produce a first resonance frequency when a first light beam circulates through said hollow core in said first counter-propagating direction; and
            produce a second resonance frequency when a second light beam circulates through said hollow core in said second counter-propagating direction, a difference between said first resonance frequency and said second resonance frequency indicating the rotation rate; and
        a recirculator configured to facilitate the circulation of the first and second light beams through the hollow core of the optical fiber, such that the majority of the first and second light beams travel in free space within the optical fiber and substantially all of the first and second light beams travel in free space while within the recirculator,
    wherein a preferred polarization state of the first and second light beams is substantially completely maintained while traveling within the recirculator.

2. A fiber optic gyro according to claim 1, wherein said coil encircles an area having a diameter of about 1 cm.

3. A fiber optic gyro according to claim 2, wherein said coil has about 20 to about 40 turns.

4. A fiber optic gyro according to claim 1 further comprising a rotation sensor coupled to said coil, said rotation sensor configured to measure said difference between said first resonance frequency and said second resonance frequency.

5. A fiber optic gyro according to claim 1 further comprising a beam controlling device configured to produce said first and second light beams, each of said first and second light beams having an energy content, wherein said coil is configured to pass at least about 97% of said energy content of each of said first and second light beams through said hollow core.

6. A fiber optic gyro according to claim 5, wherein each of said first and second light beams has a linewidth from about 1 MHz to about 10 KHz and said ring resonator and said beam controlling device are on a silicon-based micro-optical bench.

7. A fiber optic gyro according to claim 1, wherein said ring resonator has a first optical pathlength based on said first counter-propagating direction and a second optical pathlength based on said second counter-propagating direction, and wherein said first resonance frequency corresponds to a first integer number of wavelengths in said first optical pathlength and said second resonance frequency corresponds to a second integer number of wavelengths in said second optical pathlength.

8. A resonator fiber optic gyro of claim 1 wherein said recirculator is configured to preserve said first and said second light beams in said preferred polarization state better than a standard polarization maintaining fiber coupler.

9. A sensor for measuring a rotation rate of the sensor about an axis, the sensor comprising:
    an optical ring resonator having first and second counter-propagating directions, a first resonance frequency based on said first counter-propagating direction, and a second resonance frequency based on said second counter-propagating direction, said optical ring resonator comprising:
    a coil having the axis and comprising a first optical fiber having a hollow core and first and second ends, said optical ring resonator configured to:
        circulate a first circulating light beam through said hollow core in said first counter-propagating direction, said first circulating light beam having a frequency based on said first resonance frequency; and
        circulate a second circulating light beam through said hollow core in said second counter-propagating direction, said second circulating light beam having a frequency based on said second resonance frequency, a difference between said frequency of said first circulating light beam and said frequency of said second circulating light beam proportional to the rotation rate of the sensor about said axis; and
    a recirculator configured to facilitate the circulation of the first and second circulating light beams through the hollow core of the first optical fiber, such that the majority of the first and second circulating light beams travel in free space within the first optical fiber and substantially all of the first and second light beams travel in free space while within the recirculator; and
    a light source coupled to said optical ring resonator and configured to produce an input light beam, said first and second circulating light beams based on said input light beam,
    wherein a preferred polarization state of the first and second light beams is substantially completely maintained while traveling within the recirculator.

10. A sensor according to claim 9, wherein said light source is configured to produce first and second input light beams from said input light beam, said first circulating light beam based on said first input light beam, said second circulating light beam based on said second input light beam, said first input light beam having a frequency tuned to said first resonance frequency, and said second input light beam having a frequency tuned to said second resonance frequency.

11. A sensor according to claim 10, wherein said light source comprises a frequency shifter configured to adjust one of said frequency of said first input light beam and said frequency of said second input light beam.

12. A sensor according to claim 10, wherein said light source further comprises a wave modulator configured to frequency modulate said first and second input light beams.

13. The sensor of claim 9 wherein said recirculator is configured to preserve said first and said second light beams preferred in said polarization state better than a standard polarization maintaining fiber coupler.

14. A resonator fiber optic gyro (RFOG) comprising:
    a beam generator configured to transmit first and second input light beams, each of said input light beams having a frequency;
    a ring resonator coupled to said beam generator and having first and second counter-propagating directions, said ring resonator comprising:
        an optical fiber coil having a hollow core and configured to circulate first and second counter-propagating light beams through said hollow core, said first counter-propagating light beam based on said first input light beam, said second counter-propagating light beam based on said second input light beam; and
        a recirculator configured to facilitate the circulation of the first and second counter-propagating light beams through the hollow core of the optical fiber coil, such that the majority of the first and second counter-propagating travel in free space within the first optical fiber and substantially all of the first and second light beams travel in free space while within the recirculator; and
    a photodetector configured to detect a first resonance center based on said frequency of said first input light beam and further configured to detect a second resonance center based on said frequency of said second input light beam; and
    a frequency shifter coupled to said beam generator and configured to shift said frequency of said second input light beam by a frequency .DELTA.f to tune said second input light beam to said second resonance center, said frequency .DELTA.f indicating a rotational rate of the RFOG,
    wherein a preferred polarization state of the first and second light beams is substantially completely maintained while traveling within the recirculator.

15. An RFOG according to claim 14, wherein said optical fiber coil has first and second ends, and wherein said recirculator is further configured to:
    direct light exiting said first end to said second end; and
    direct light exiting said second end to said first end.

16. An RFOG according to claim 14, wherein said ring resonator has a first resonance frequency based on said first counter-propagating direction and has a second resonance frequency based on said second counter-propagating direction; and
    wherein said photodetector comprises:
    a first photodetector configured to determine an intensity of a first output light beam, said first output light beam based on said first circulating light beam, said intensity of said first output light beam being a function of said frequency of said first input light beam relative to said first resonance frequency; and
    a second photodetector configured to determine an intensity of a second output light beam, said second output light beam based on said second circulating light beam, said intensity of said second output light beam being a function of said frequency of said second input light beam relative to said second resonance frequency.

17. An RFOG according to claim 16, wherein said beam generator is a tunable laser; and
    wherein said recirculator is a high reflectivity laser mirror.

18. An RFOG according to claim 14, wherein when said beam generator, said ring resonator, said photodetector, and said frequency shifter are on a silicon-based micro-optical bench.

19. An RFOG according to claim 14, wherein said beam generator has a first resonance frequency based on said first counter-propagating direction, said beam generator comprises:
- a tunable light source configured to generate a narrow light beam having a linewidth less than or equal to 1 MHz and a frequency $f_0$, said frequency $f_0$ tuned to said first resonance frequency; and
- a beam splitter configured to receive said narrow light beam and generate said first and second input light beams.

20. An RFOG according to claim 14, wherein said rotational rate has a bias stability of about 1 degree per hour to about 0.01 degree per hour and an angle random walk (ARW) of about 0.1 degree per root hour to about 0.001 degree per root hour.

21. An RFOG according to claim 14, wherein said optical fiber coil encircles an area having a diameter of about 1 cm.

22. The REOG of claim 14 wherein said recirculator is configured to preserve said first and said second light beams in said preferred polarization state better than a standard polarization maintaining fiber coupler.

* * * * *